Jan. 11, 1955    A. V. ANDRÉN    2,699,081
APPARATUS FOR SETTING OR RELEASING NUT AND SCREW MEANS
Filed Feb. 26, 1954    4 Sheets-Sheet 1
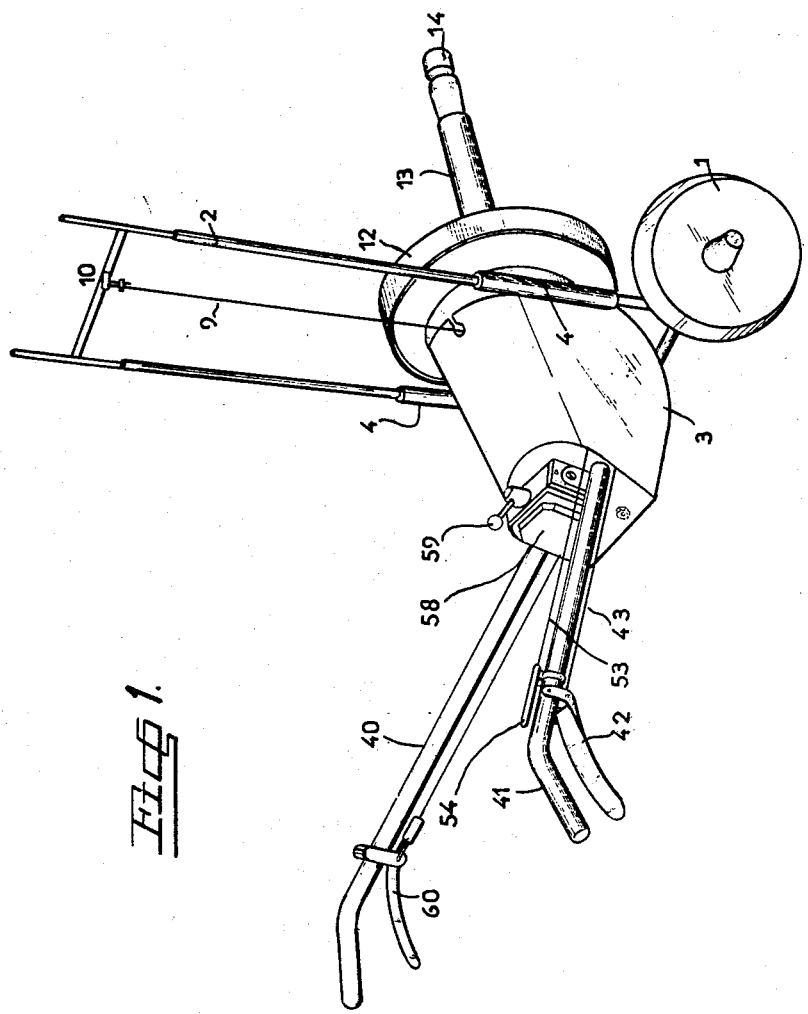
INVENTOR
A. V. Andrén
BY
Wenderoth, Lind & Ponack
ATTORNEYS

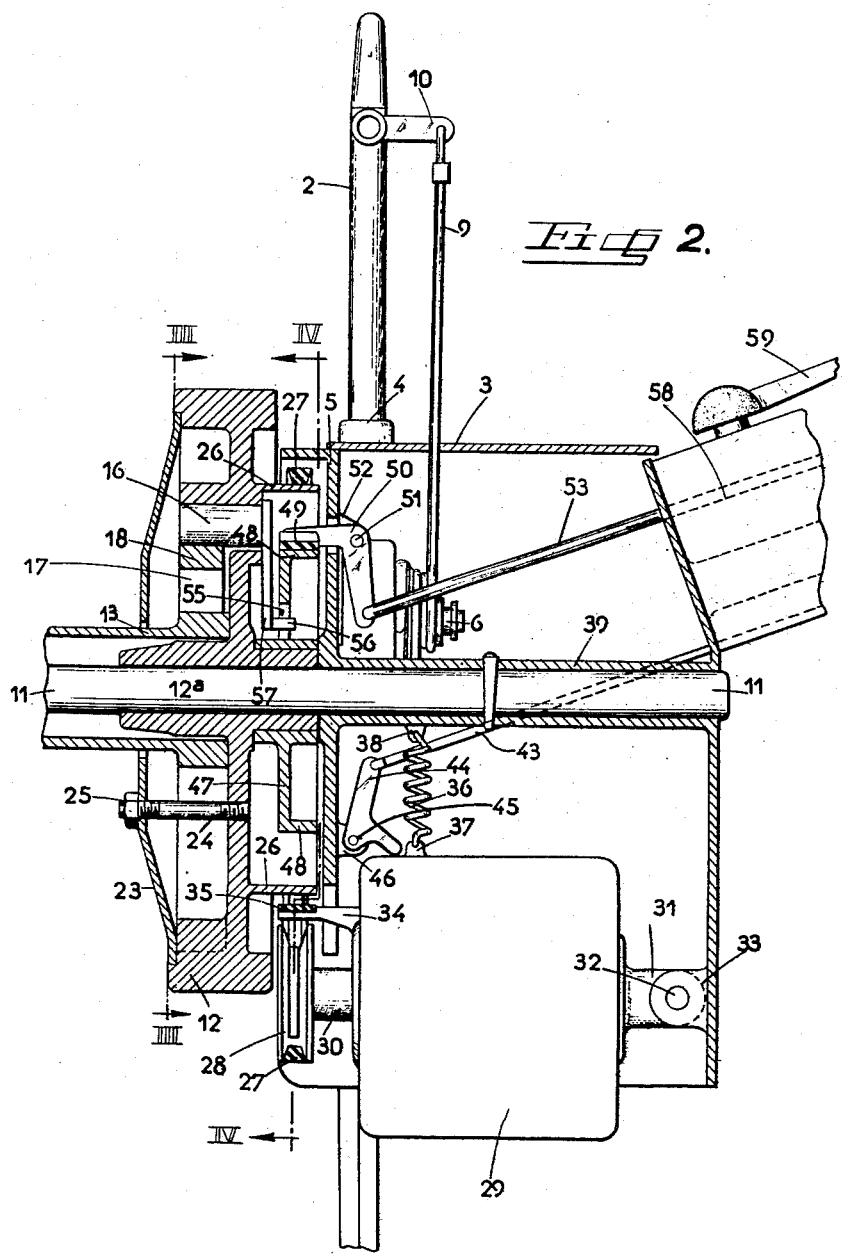

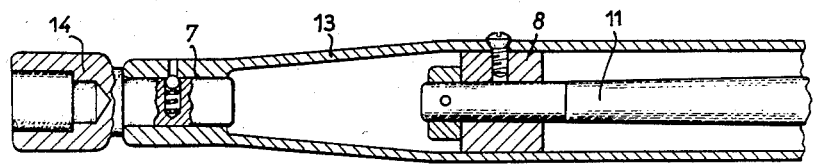
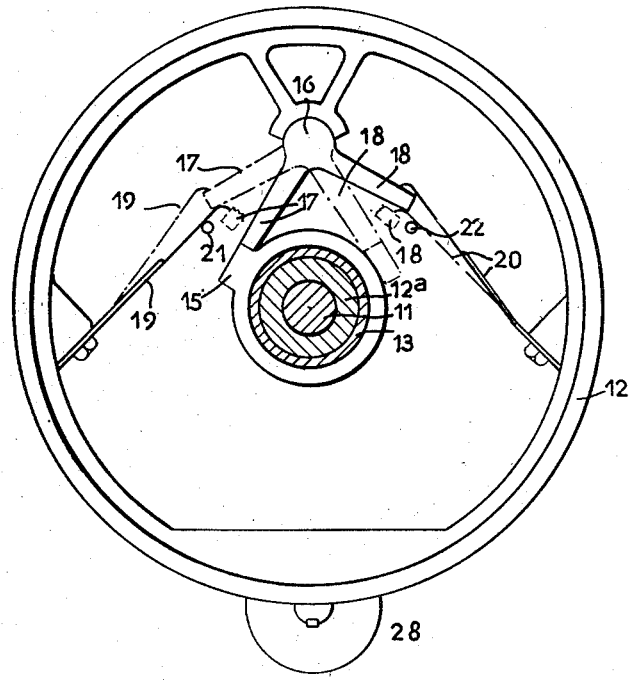

Jan. 11, 1955 A. V. ANDRÉN 2,699,081
APPARATUS FOR SETTING OR RELEASING NUT AND SCREW MEANS
Filed Feb. 26, 1954 4 Sheets-Sheet 4

INVENTOR
A. V. Andren
BY
Wenderoth, Lind & Ponack
ATTORNEYS

United States Patent Office 2,699,081
Patented Jan. 11, 1955

2,699,081

APPARATUS FOR SETTING OR RELEASING NUT AND SCREW MEANS

Anders Villiam Andrén, Goteborg, Sweden, assignor to Roger Antraique, Paris, France Application February 26, 1954, Serial No. 412,857

6 Claims. (Cl. 81—52.4)

This invention relates to an apparatus for setting or releasing nuts, screws or the like with the aid of a tool engaging the nut or the like and arranged on a spindle which is mounted in a frame and which is connectible by means of a positive, engageable and disengageable clutch with a flywheel intended to be given a rotary motion by a motor over a frictional driving connection.

One of the principal objects of the invention is to provide an apparatus of the abovementioned type, in which no reaction forces will act on the frame carrying the apparatus, when the flywheel is disconnected from the motor by breaking the frictional driving connection on exerting great torques, whereby the frame can be made lighter and dispense with any long supporting arms for taking up reaction forces to prevent the frame from turning about the axis of the tool when the apparatus is employed.

Another and related object of the invention is to provide an apparatus of the kind set forth, in which the operator is not exposed to any tiring vibratory movements and does not exert any tiring force to counteract reaction forces on the frame.

A further object of the invention is to provide an apparatus of the kind set forth having simple and easily operable control means.

Further objects and features of the apparatus according to the invention will appear from the following detailed description of a preferred embodiment of the invention shown in the accompanying drawings. In the drawings:

Fig. 1 is a perspective view of an apparatus according to the invention.

Fig. 2 shows a part of an axial section through the apparatus on a larger scale.

Fig. 3 is a section on line III—III of Fig. 2, certain parts being omitted for greater clarity.

Fig. 5 is an axial section through the outer end portion of the tool supporting spindle of the apparatus. (This figure can be considered a continuation of Fig. 2, where this end portion had to be left out as there was not sufficient room within the drawing format.)

Figure 4:
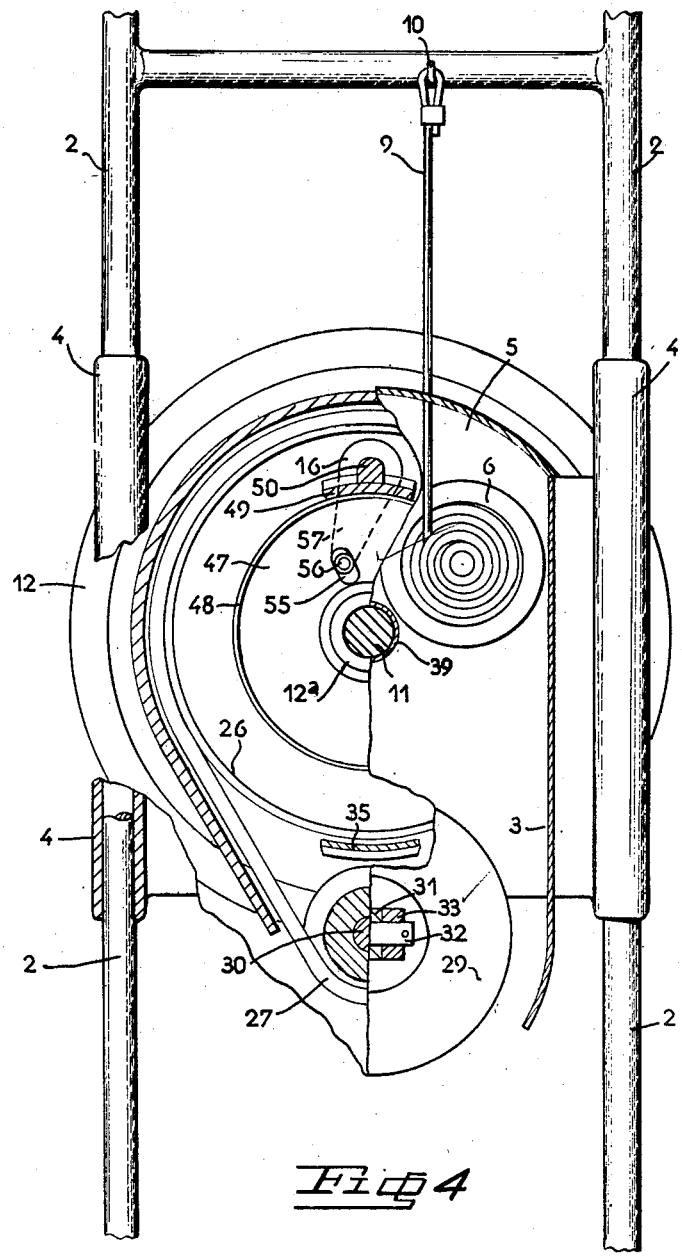
Fig. 4 shows in the left-hand portion a section substantially on line IV—IV of Fig. 2 and in the right-hand portion a section substantially on line V—V of Fig. 2.

The apparatus illustrated in the drawings comprises a substantially rectangular frame which is constructed from tubes and supported on wheels 1 (only one of which is shown in Fig. 1), and a casing 3 which is slidably mounted on the vertical tubes of the frame by means of two sleeve members 4 each of which embraces one of the vertical tubes of the frame 2. The casing 3 carries on a shield 5 a spring and cable drum device 6 which is connected by means of a cable 9 to a projection 10 on the upper horizontal tube of the frame 2 and serves the purpose of balancing the weight of the casing 3 and the parts mounted thereon and to be described hereinafter, in any position of displacement of the casing 3 along the vertical tubes of the frame 2.

A shaft 11 is non-rotatably secured in the casing 3 at right angles to the plane of the frame 2. On one side of the shield 5 there is mounted on said shaft 11 a flywheel 12, the hub portion 12a of which projects in both directions from the flywheel body to serve as the mounting means for the parts described in the following. The shaft 11 extends from the flywheel 12 by a considerable amount on the side of the flywheel remote from the shield 5 and on this extending end of the shaft there is passed a tubular spindle 13. Said spindle has its end remote from the flywheel 12 formed in the known manner as a mounting means 7 for an exchangeable tool 14, such as a socket wrench (see (Figs. 1 and 5) for engaging a nut to be set or released, a screw driver for engaging a screw for setting or releasing it, etc. The tubular spindle 13 has its end facing the flywheel 12 mounted on one end of the flywheel hub 12a and its other end mounted on the end of shaft 11 by means of a bearing 8 (see Fig. 5). Within the area of the hub portion 12a of the flywheel the tubular spindle 13 is provided with one (or more) integral heavy axial projection 15 which in the manner hereinafter described is adapted to engage a pawl mounted on the flywheel 12. Said pawl is constituted by a pin 16 rotatably but non-displaceably mounted in the flywheel body and two arms 17 and 18 extending from said pin and making an angle with each other. Furthermore, there are secured to the flywheel 12 two leaf springs 19 and 20 which tend to bear against stops 21 and 22, respectively, fixed to the flywheel. When the pawl 16—18 is inoperative, the two leaf springs 19 and 20 bear against their stops 21 and 22, thereby holding the pawl arms 17 and 18 in the position shown by dash and dot lines in Fig. 3 (only the outer ends of the pawl arms are shown in this position), in which both pawl arms 17 and 18 during the rotation of the flywheel 12 can move past the projection 15 of the tubular spindle 13 without contacting it. However, if the pawl 16—18 is operated in the manner hereinafter described so that it is swung either to the position shown by full lines in Fig. 3 or to the position shown by dash lines in the same figure, one leaf spring 19 or 20 is lifted away from its stop 21 and 22, respectively, by the corresponding pawl arm 17 and 18, respectively, while the other pawl arm 18 and 17, respectively, arrives at a position in which the arm during the rotation of the flywheel 12 abuts the projection 15 of the tubular spindle 13, thereby positively connecting the flywheel 12 with the tubular spindle 13 and thus with the tool 14.

A cover 23 is fastened by means of bolts 24 and nuts 25 on the side of the flywheel 12 remote from the shield 5 to conceal and protect the positive clutch formed by the pawl 16—18 and the projection 15. The cover 23 has a central hole to enable the tubular spindle 13 to pass freely therethrough.

On the side facing the shield 5 the flywheel 12 has a cylindrical flange 26 which serves as a pulley for a V-belt 27. Said belt also passes over a pulley 28 which is secured to the shaft 30 of a motor 29. By means of a lug 31 said motor 29 is mounted for pivotment on a pin 32 which is carried in two lugs 33 on the casing 3. By swinging the motor about the pivot 32 the pulley 28 can be moved towards and away from the pulley 26 of the flywheel 12 for tightening or slackening the V-belt 27 so that it forms together with the pulleys 26 and 28 a frictional driving connection between the motor 29 and the flywheel 12. However, it should be observed already in this connection that said frictional driving connection can be constructed in many other ways than that shown, e. g. in the form of a friction roller on the motor shaft 30, which roller may be pressed under friction against the cylindrical flange 26 of the flywheel 12, or e. g. in the form of a customary friction clutch of the conical or disc type, in which case the motor can be arranged coaxially with the flywheel.

An arm 34 is secured on the motor and carries a brake shoe 35 which may be pressed against the pulley flange 26 of the flywheel 12 by swinging the motor upwardly, after the frictional driving connection 26—28 between the motor and the flywheel has been broken by slackening the belt 27.

A pull spring 36 is expanded between a lug 37 on the motor and a lug 38 on a sleeve 39 of the casing 3 surrounding the shaft 11. The spring 36 tends to swing the motor upwardly to press the brake shoe 35 against the pulley flange 26 to brake the flywheel 12. The casing 3 is provided with two handle arms 40 and 41 by means of which the operator can push the apparatus to the job location and raise and lower the casing 3 on the frame 2. On the handle arm 41 there is pivotally mounted a control means 42 which is connected by means of a rod 43 to one arm of a bell crank lever 44. Said lever is pivotally mounted on a shaft 45 which is carried in a pair of lugs 46 which are fixed to the shield 5. The other arm of the bell crank lever 44 bears against the upper side of the motor 29. When the operator presses the control means 42 towards the handle bar 41 with his fingers, there is exerted a pull on the rod 43 in a manner known in and per se so that the bell crank lever 44 is swung clockwise as viewed in Fig. 2 and said lever in turn swings the motor 29 downwardly against the action of the spring 36 while tightening the belt 37 so that a frictional driving connection is established between the motor and the flywheel 12.

A disk 47 having a cylindrical peripheral flange 48 is freely rotatably mounted on the end of the hub portion 12a of the flywheel 12, which projects towards the shield 5. Adjacent the peripheral flange 48 a brake shoe 49 is disposed on one arm of a bell crank lever 50 which is pivotally mounted on a shaft 51 which is supported by a pair of lugs 52 on the side of the shield 5 remote from the flywheel 12. The arm of the bell crank lever 50 that carries the brake shoe 49 passes through an opening in the shield 5, while the other arm of the bell crank lever 50 is connected to a pullrod 53 extending upwardly along the handle bar 41 to a control means 54. This control means is formed in a known manner as a pivotal bell crank lever which the operator can swing in one direction for exerting a pull in the rod 53 to press the brake shoe 49 against the flange 48 of the disk 47, and in the opposite direction to exert a pressure on the rod 53 to remove the brake shoe 49 from the flange 48. The disk 47 has a slot 55 into which a pin 56 extends which is secured to an arm 57 fixed to the shaft 16 of the pawl 16—18 on the side of said shaft facing the shield 5. When the brake shoe 49 is disengaged from the flange 48 of the disk 47 and the motor 29 drives the flywheel 12, the disk 47 participates in the rotation of the flywheel in that the shaft 16 of the pawl which is carried along with the flywheel takes the disk 47 along by its pin and slot connection 55—57 with the disk 47, the leaf springs 19 and 20 which actuate the pawl arms 17, 18 and bear against their stops 21 and 22 preventing the arm 57 from swinging. When the brake shoe 49 is pressed against the flange 48 of the disk 47 with the intermediary of the control means 54, there arises so great a resistance to the rotation of the disk 47 that the latter over the pin 56 and the arm 57 brings the pawl 16—18 to swing into position of engagement against the action of one leaf spring 19 or 20, depending on the direction of rotation of the flywheel 12.

The motor 29 can be started in the desired direction of rotation in a manner known and not described in detail by means of a switch 58 mounted on the casing 3 and operable with the aid of a handle 59. Besides, the casing 3 may be clamped at the desired level on the frame 2 by means of a locking means (not shown) which frictionally engages one vertical tube of the frame 2 and which is momentarily disengageable by means of a control means 60 mounted on the handle rod 40.

When the apparatus described above is to be used for instance for releasing the fastening nuts of a truck wheel, the apparatus is first moved up to the side of the truck wheel and then the operator depresses the handle 60 for relasing the casing 3 from the frame 2 and raises or lowers the casing 3 until the socket wrench 14 is situated at the correct level for engagement with one of the truck wheel nuts, whereupon the handle 60 is released so that the casing is locked in the correct height position. The tool 14 is caused to engage the nut and the handle 59 is swung to one side for starting the motor 29 in the direction of rotation suitable for a counter-clockwise rotation of the tool 14. Then the handle 42 is moved towards the handle bar 41 so that the bell crank lever 44 presses the motor 29 downwardly, thereby tightening the belt 27 about the pulleys 26 and 28. Thus, a frictional driving connection is established between the motor 29 and the flywheel 12 so that the motor can cause the flywheel 12 to rotate rapidly. After the flywheel has been accelerated to the desired speed (the maximum speed is determined by the operating number of revolutions of the motor and the transmission ratio between the motor and the flywheel), the operator releases the handle 42 somewhat so that the spring 36 can swing the motor 29 upwardly and slacken the belt 27 for disconnecting the flywheel 12 from the motor 29. At the same time the operator moves the handle 54 in such a direction that the rod 53 causes the lever 50 to swing the brake shoe 49 into engagement with the disk 47 to exert such a resistance against the participation of the disk 47 in the rotation of the flywheel 12 that the disk 47 performs a relative movement with respect to the flywheel 12, thereby swinging the arm 57 in such a way that the pawl 16—18 is swung to the position shown by dot lines in Fig. 3 against the action of the leaf spring 19. After a certain rotation of the flywheel 12 following the described swinging movement of the pawl 16—18, the pawl arm 18 abuts the stationary projection 15 (or some of the projections) on the tubular spindle 13 so that the latter and thus the socket wrench 14 are carried along by tangential hammering action in the rotary movement of the flywheel 12 whereby the nut is subjected to a very large torque. Should the nut however not be loosened entirely on the first trial, the disk 47 is disconnected from the brake 49 by the operator acting upon the handle 54, whereupon the described operations are repeated until the nut is loosened. It is readily realized that during the hammering action on the nuts the frame 2 is not subjected to any tipping forces since the flywheel 12 is disconnected from the eccentrically driving motor 29 and is concentrically arranged relatively to the spindle 13 of the tool 14. Thus, the distance between the wheels 1 of the frame can be held as low as possible without any risk that the apparatus will keel over in use. The apparatus is not either exposed to any vibration forces directed axially with respect to the spindle 13 of the tool 14, for which reason the operator is not exposed to tiring vibrations and does not need to make an effort to hold the apparatus in the correct operating position, but can concentrate on operating the various control means of the apparatus.

When the nut has been unset and unscrewed by the rotation of the flywheel 12, the latter is rapidly stopped by the operator releasing the handle 42 so that the spring 36 can raise the motor 29 so much that the brake shoe 35 is engaged with the pulley flange 26 and brakes the flywheel 12.

When a nut is to be tightened instead of released one proceeds in exactly the same manner as described above except that the motor 29 is caused to rotate in the opposite direction, the disk 47, when braked by means of the brake shoe 49, swinging the pawl 16—18 into the position shown by full lines in Fig. 3 for engagement with the projection 15 so that the tool 14 will be rotated by hammering action clockwise instead of counter-clockwise.

The invention must of course not be considered as limited to the embodiment described above and illustrated in the drawings, for many modifications and changes may be resorted to within the scope of the inventive idea defined in the appendant claims.

What I claim and desire to secure by Letters Patent is:

1. An apparatus for setting and releasing nut and screw means, comprising a frame, a spindle rotatably mounted on said frame, a tool non-rotatably mounted on said spindle and adapted to engage the nut or screw means to be set or released, a flywheel rotatably mounted in said frame coaxially with said spindle, a positive, engageable and disengageable clutch for interconnection of said spindle and said flywheel, a first manually operable control means on said frame controlling said positive clutch, a rotative power source on said frame, a frictional driving connection between said power source and said flywheel, and a second manually operable control means on said frame, operatively connected with said frictional driving connection to establish and break said frictional connection when manipulated.

2. An apparatus for setting and releasing nut and screw means, comprising a frame, a spindle rotatably mounted on said frame, a tool non-rotatably mounted on said spindle and adapted to engage the nut or screw means to be set or released, a flywheel rotatably mounted in said frame coaxially with said spindle, a positive engageable and disengageable clutch for interconnection of said spindle and said flywheel, a first manually operable control means on said frame controlling said positive clutch, a rotative power source on said frame, pulley means secured to said power source, pulley means associated with said flywheel, belt means passing over and frictionally engaging said pulley means to rotate said flywheel by means of said power source, means mounting said power source on said frame so as to be displaceable towards and away from said pulley means associated with said flywheel, a second manually operable control means on said frame, connected with said power source so as to displace said power source to tighten and slack said belt means when manipulated.

3. An apparatus for setting and releasing nut and screw means, comprising a frame, a spindle rotatably mounted on said frame, a tool non-rotatably mounted on said spindle and adapted to engage the nut or screw means to be set or released, a flywheel rotatably mounted in said frame coaxially with said spindle, a positive, engageable and disengageable clutch for interconnection of said spindle and said flywheel, a first manually operable control means on said frame controlling said positive clutch, a rotative power source on said frame, pulley means secured to said power source, pulley means associated with said flywheel, belt means passing over and frictionally engaging said pulley means to rotate said flywheel by means of said power source, means mounting said power source on said frame so as to be displaceable towards and away from said pulley means associated with said flywheel, a second manually operable control means on said frame, connected with said power source so as to displace said power source to tighten and slack said belt means when manipulated, and a brake shoe operatively connected with said power source so as to participate in the displacement of said power source and engage said pulley means associated with said flywheel to brake said flywheel when said power source is displaced towards said last mentioned pulley means by means of said second control means.

4. An apparatus for setting and releasing nut and screw means, comprising a frame, a spindle rotatably mounted on said frame, a tool non-rotatably mounted on said spindle and adapted to engage the nut or screw means to be set or released, a flywheel rotatably mounted in said frame coaxially with said spindle, a first half of a positive, engageable and disengageable clutch, secured to said spindle, a second half of said clutch connected to said flywheel so as to participate in the rotary movement of said flywheel, a first manually operable control means on said frame, an adjusting member connected to said second half of said clutch and rotatable in relation to but participating, when not actuated, in the rotary movement of said flywheel, a brake means on said frame operatively connected with said first control means and adapted, when actuated by said first control means, to brake said adjusting member, said adjusting member being adapted, when rotating in relation to said flywheel due to braking by means of said brake means, to move said second clutch half into position for engagement with said first clutch half, a rotative power source on said frame, a frictional driving connection between said power source and said flywheel, and a second manually operable control means on said frame, operatively connected with said frictional driving connection to establish and break said frictional connection when manipulated.

5. An apparatus for setting and releasing nut and screw means, comprising a frame, a spindle rotatably mounted on said frame, a tool non-rotatably mounted on said spindle and adapted to engage the nut or screw means to be set or released, a flywheel rotatably mounted in said frame coaxially with said spindle, radial projection means on said spindle, a pawl mounted on said flywheel and adapted, when actuated, to engage said radial projection means, spring means normally holding said pawl disengaged from said radial projection means, a first manually operable control means on said frame, an adjusting member rotatably mounted in relation to said flywheel in said frame, a pin and slot connection between said adjusting member and said pawl, urging said adjusting member to participate in the rotation of said flywheel, a brake means on said frame operatively connected with said first control means and adapted, when actuated by said first control means, to brake said adjusting member so as to bring about a relative rotation of said adjusting member and said flywheel, said pin and slot connection swinging, during said relative rotation, said pawl into a position for engagement with said radial projection means against the action of said spring means, a rotative power source on said frame, a frictional driving connection between said power source and said flywheel, and a second manually operable control means on said frame, operatively connected with said frictional driving connection to establish and break said frictional connection when manipulated.

6. An apparatus as set forth in claim 1 wherein a substantially vertical support is provided, means for causing said frame to slide along said support and means for immobilizing said frame at any predetermined position along said support.

References Cited in the file of this patent

UNITED STATES PATENTS

| 1,341,701 | Alexander | June 1, 1920 |
| 1,807,367 | Woolery | May 26, 1931 |
| 2,037,701 | Bronander | Apr. 21, 1936 |
| 2,256,496 | Robinson | Sept. 23, 1941 |
| 2,281,263 | Bronander | Apr. 28, 1942 |
| 2,566,661 | Hamlin | Sept. 4, 1951 |
| 2,639,637 | Stirzel | May 26, 1953 |